United States Patent [19]
Jeon

[11] Patent Number: 5,991,497
[45] Date of Patent: *Nov. 23, 1999

[54] METHOD AND APPARATUS FOR RECORDING AND REPRODUCING TRICK PLAY DATA TO AND FROM A DIGITAL VIDEO TAPE

[75] Inventor: Jong-gu Jeon, Suwon, Rep. of Korea

[73] Assignee: Samsung Electronics Co., Ltd., Kyungki-do, Rep. of Korea

[*] Notice: This patent is subject to a terminal disclaimer.

[21] Appl. No.: 09/049,078

[22] Filed: Mar. 27, 1998

Related U.S. Application Data

[63] Continuation of application No. 08/611,847, Mar. 8, 1996, Pat. No. 5,832,172.

[30] Foreign Application Priority Data

Sep. 14, 1995 [KR] Rep. of Korea ...................... 95-30073

[51] Int. Cl.$^6$ .................................................. H04N 5/783
[52] U.S. Cl. ............................................. 386/68; 386/111
[58] Field of Search ................................ 386/68, 81, 80, 386/112, 111, 124, 46; H04N 5/783

[56] References Cited

U.S. PATENT DOCUMENTS

| | | | |
|---|---|---|---|
| 5,377,051 | 12/1994 | Lane et al. | 386/81 |
| 5,543,932 | 8/1996 | Chang et al. | 386/81 |
| 5,550,643 | 8/1996 | Azadegan | 386/124 |
| 5,587,789 | 12/1996 | Lee et al. | 386/68 |
| 5,661,845 | 8/1997 | Sugiyama | 386/68 |
| 5,712,946 | 1/1998 | Yanagihara | 386/68 |
| 5,832,172 | 11/1998 | Jeon | 386/68 |

*Primary Examiner*—Huy Nguyen
*Attorney, Agent, or Firm*—Sughrue, Mion, Zinn, Macpeak & Seas, PLLC

[57] ABSTRACT

A method for recording and reproducing trick play data to and from a digital video tape is provided. In the recording method, an advanced television (ATV) signal which contains normal data used during a normal play mode and intra-frame data used during a trick play mode is input. Furthermore, the intra-frame data, which is capable of being independently decoded, is extracted from the ATV signal. Then, the size of the intra-frame data is adjusted to a predetermined picture size by partially decoding the intra-frame data to produce windowed intra-frame data, and the windowed intra-frame data is recorded as trick play data on the digital video tape. In the reproducing method, the ATV signal containing the normal and trick play data are reproduced from the digital video tape. Moreover, the trick play data is extracted from the ATV signal and formatted during a trick play mode, and the normal data is extracted from the ATV signal during a normal play mode. Then, the normal play data or trick play data is selectively output to a decoder. Accordingly, the method enables various types of video head scanners to record or reproduce the trick play data at a maximum multiple-speed (e.g. a 13-multiple-speed) or less than the maximum multiple-speed. In addition, a recording and reproducing apparatus which performs the method above is also provided.

8 Claims, 9 Drawing Sheets

FIG. 2
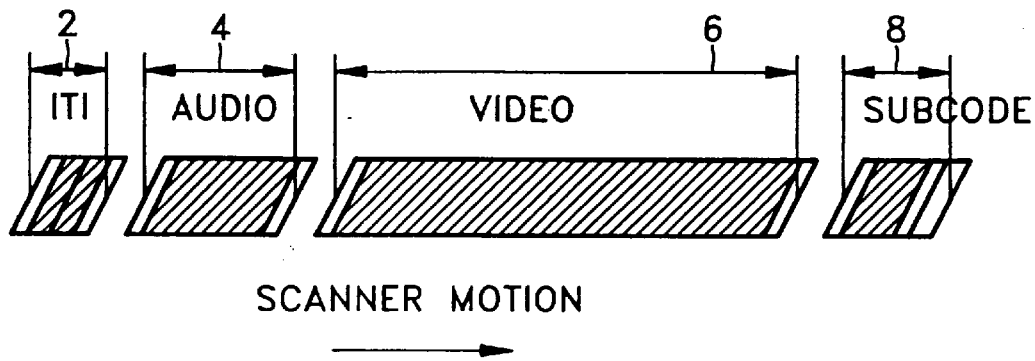
SCANNER MOTION →
FIG. 3A  2 HEADS
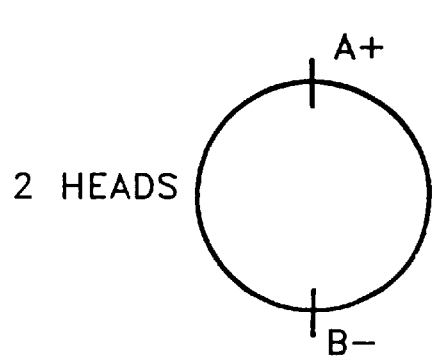 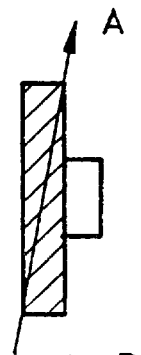
FIG. 3B  1 DOUBLE AZIMUTH HEAD
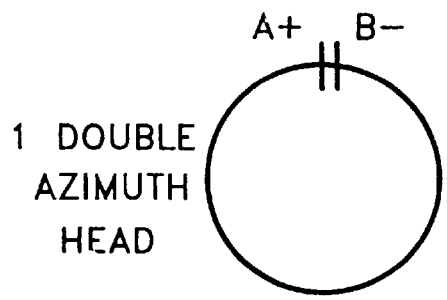 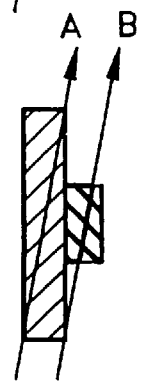
FIG. 3C  2 DOUBLE AZIMUTH HEADS
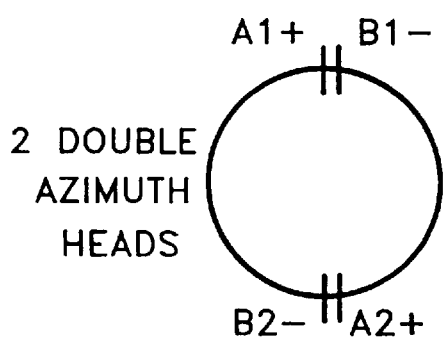 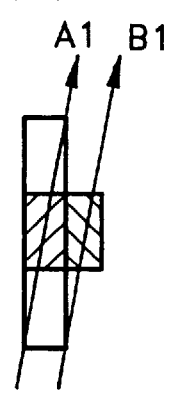

METHOD AND APPARATUS FOR RECORDING AND REPRODUCING TRICK PLAY DATA TO AND FROM A DIGITAL VIDEO TAPE

This is a continuation of application Ser. No. 08/611,847 filed Mar. 8, 1996, U.S. Pat. No. 5,832,172.

FIELD OF THE INVENTION

The present invention relates to method and apparatus for recording and reproducing data to and from digital video tapes. More particularly, the invention relates to a method and apparatus for recording and reproducing an advanced television (ATV) signal having trick play data to and from digital video tapes.

BACKGROUND OF THE INVENTION

A digital standard definition-video cassette recorder (SD-VCR) that is capable of recording and reproducing ATV signals on digital video tapes is currently being developed for consumer use. Furthermore, the SD-VCR is able to transmit data at 24.9 Mbits per second, and the ATV signal which is recorded or reproduced from the SD-VCR has a transmission rate of 19.3 Mbits per second. Consequently, the SD-VCR is capable of recording or reproducing additional data to and from the video tape at a rate of 5.6 Mbits per second.

In order to more fully utilize the unused area of the video tape, various methods are currently being tested in which trick play data is recorded in the unused area so that the ATV signal can be reproduced during a trick play mode (e.g. a high speed forward reproduction mode, a high speed reverse reproduction mode, or any other non-normal speed reproduction mode). Furthermore, developing an efficient process for recording and reproducing such trick play data is essential for enabling various types of scanners (i.e. video heads) to reproduce signals at a variety of speeds during the trick play mode. Furthermore, such method will also improve the image quality of video signals and remove noise from the video signals.

In order to provide a better understanding of the present invention, the composition of an ATV signal will be briefly described below in conjunction with FIG. 1. As shown in the figure, the ATV signal contains a transport bit stream which includes a series of groups-of-pictures (GOPs), and each GOP has a certain number of pictures (e.g. 12 pictures) arranged in a particular order. The various pictures contained in the GOP may include intra-coded pictures (I-pictures), predictive-coded pictures (P-pictures), and bidirectionally predictive-coded pictures (B-pictures).

The I-pictures are digitally represented by the greatest number of bits and have the most significant effect upon the image quality of the entire GOP and the capability of encoding the various P-pictures. Since the I-pictures, or intra-frames, contain a large number of bits, they can be independently coded and decoded.

The P-pictures are represented by fewer bits than the I-pictures and are coded or decoded based on the information contained in the various I-pictures. Specifically, the P-pictures are predicted frames which are encoded by compensating for the movement contained in the previous intra-frames or the previous predicted frames.

The B-pictures are represented by a smaller number of bits than the P-pictures and are coded or decoded in accordance with the information contained in the various I-pictures and P-pictures. In particular, the B-pictures are bidirectionally predicted frames which are encoded by compensating for the movement contained in the previous intra-frames, subsequent intra-frames, previous predicted frames, and/or subsequent predicted frames.

When all of the I-pictures, P-pictures, and B-pictures are encoded, they are arranged in a predetermined order to form the GOP. For instance, as illustrated in FIG. 1, the pictures are organized in the following order: I-B-B-P-B-B-P-B-B-P-B-B-I.

Each of the pictures are further divided into various segments. Specifically, each picture contains a certain number of slices, and each slice includes a predetermined number of macro blocks. In addition, each macro block comprises a number of discrete cosine transform (DCT) blocks.

Conventional apparatuses cannot appropriately record and reproduce normal video data and trick play data when the ATV signal is recorded or reproduced in accordance with a Moving Picture Expert Group (MPEG)-2 format. For example, when the ATV signal is recorded, the P-pictures and B-pictures can only be decoded after the I-pictures have been completely decoded. As a result, decoding the P-pictures and B-pictures and reproducing the ATV signal at a high-speed is impossible.

SUMMARY OF THE INVENTION

One object of the present invention is to provide a method for recording and reproducing trick play data to and from a digital video tape. Furthermore, the trick play data is recorded by partially decoding bit streams of intra-coded pictures contained in a group of pictures and recording the decoded bit streams in certain tracks of the digital video tape. Also, the trick play data is reproduced by reading the decoded bit streams from the certain tracks of the video tape.

Another object of the present invention is to provide an apparatus for performing the recording and reproducing methods above.

To achieve one of the objects above, a method for recording trick play data and normal data on a digital video tape is provided. Specifically, the trick play data is used in a trick play mode and the normal data is used in a normal play mode, the trick play data is contained in an advanced television signal which includes first frame data and second frame data, and the method comprises the steps of: (a) decoding the advanced television signal to obtain side information; (b) storing the normal data contained in the advanced television signal; (c) selecting the first frame data from the advanced television signal; (d) adjusting a picture size of the first frame data based on the side information to produce windowed first frame data having a predetermined picture size; (e) converting the windowed first frame data into an MPEG-2 bit stream; (f) correcting header information contained in the MPEG-2 bit stream in accordance with the side information; (g) mixing the normal data and the MPEG-2 bit stream to produce mixed data; (h) formatting the mixed data into formatted data, wherein the formatted data comprises sync blocks; (i) adding various codes to the formatted data; and (j) recording the formatted data on the digital video tape such that the first frame data and the second frame data are recorded on the digital video tape and respectively correspond to the trick play data and the normal data.

To achieve another one of the objects above, a method for reproducing trick play data and normal data from a digital video tape is provided. In particular, the trick play data is used in a trick play mode and the normal data is used in a normal play mode, the trick play data corresponds to first frame data contained in an advanced television bit stream previously recorded on the digital video tape, and the method comprises the steps of: (a) reproducing the advanced television bit stream from the digital video tape; (b) determining whether the advanced television bit stream is being reproduced during the normal play mode or the trick play mode; (c) extracting the normal data from the advanced television bit stream when the advanced television bit stream is being reproduced during the normal play mode; (d) extracting the first frame data from the advanced television bit stream when the advanced television bit stream is being reproduced during the trick play mode; (e) temporarily storing the first frame data after the first frame data has been extracted; and (f) selectively outputting the first frame data or the normal data to a decoder.

To achieve a further object of the present invention, an apparatus for recording trick play data and normal data on a digital video tape is provided. Specifically, the trick play data is used in a trick play mode and the normal data is used in a normal play mode, the trick play data is contained in an advanced television signal which includes first frame data and second frame data, and the apparatus comprises: frame selecting means for decoding the advanced television signal to obtain side information, for storing the normal data contained in the advanced television signal, and for selecting the first frame data from the advanced television signal; windowing means for adjusting a picture size of the first frame data output from the first selecting means based on the side information to produce windowed first frame data having a predetermined picture size; information correcting means for converting the windowed first frame data into an MPEG-2 bit stream and for correcting header information contained in the MPEG-2 bit stream in accordance with the side information; data mixing means for mixing the normal data and the MPEG-2 bit stream to produce mixed data; formatting means for formatting the mixed data into formatted data, wherein the formatted data comprises sync blocks; adding means for adding various codes to the formatted data; and recording means for recording the formatted data on the digital video tape such that the first frame data and the second frame data are recorded on the digital video tape and respectively correspond to the trick play data and the normal data.

To achieve yet another object of the present invention, an apparatus for reproducing trick play data and normal data from a digital video tape is provided. The trick play data is used in a trick play mode and the normal data is used in a normal play mode, the trick play data corresponds to first frame data contained in an advanced television bit stream previously recorded on the digital video tape, and the apparatus comprises: reproducing means for reproducing the advanced television bit stream from the digital video tape; system control means for determining whether reproducing means is reproducing the advanced television bit stream during the normal play mode or the trick play mode; normal data extracting means for extracting the normal data from the advanced television bit stream when the advanced television bit stream is being reproduced during the normal play mode; trick data extracting means for extracting the first frame data from the advanced television bit stream when the advanced television bit stream is being reproduced during the trick play mode; storing means for temporarily storing the first frame data after the first frame data has been extracted by the trick data extracting means; and selecting means for selectively outputting the first frame data output from the storing means or the normal data output from the normal data extracting means to a decoder.

BRIEF DESCRIPTION OF THE DRAWINGS

The above objects and advantages of the present invention will become more apparent by describing in detail a preferred embodiment thereof with reference to the attached drawings in which:

FIG. 2 illustrates a track of a digital video tape used in a standard definition-video cassette recorder;

FIG. 3A illustrates the video head structure and track scan path of a first type of scanner capable of reproducing a signal recorded on the tape illustrated in FIG. 2;

FIG. 3B illustrates the video head structure and track scan path of a second type of scanner capable of reproducing a signal recorded on the tape illustrated in FIG. 2;

FIG. 3C illustrates the video head structure and track scan path of a third type of scanner capable of reproducing a signal recorded on the tape illustrated in FIG. 2;

DETAILED DESCRIPTION OF THE PREFERRED EMBODIMENTS

In order to more fully understand the present invention, a digital video tape and various video heads (or scanners) used in a standard definition-video cassette recorder (SD-VCR) will be described. An example of a track of the digital video tape is shown in FIG. 2. In particular, the track contains an insert and track information (ITI) sector 2, an audio sector 4, a video sector 6, and a subcode sector 8. Furthermore, gaps are located between each of the sectors, and the track is scanned by a video head in a direction from the ITI sector 2 towards the subcode sector 8.

The ITI sector 2 contains a pre-amble area, a start-sync block area, a track information area, and a post-amble area. In addition, the subcode sector 8 has a subcode pre-amble area, a subcode sync block area, and a subcode post-amble area. Moreover, an overwrite margin is located after the subcode sector 8 to provide a buffer between adjacent tracks of the video tape.

Figure 1:
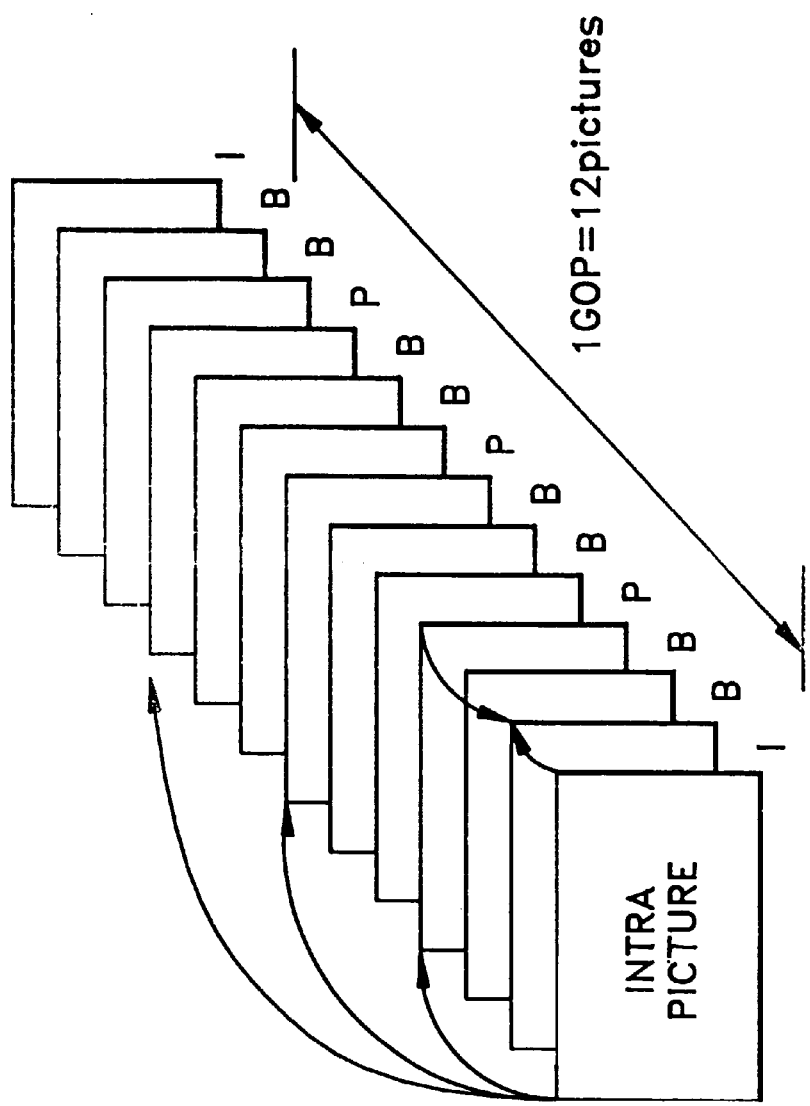
FIG. 1 illustrates a group of pictures having three types of coded pictures.
Figure 4:
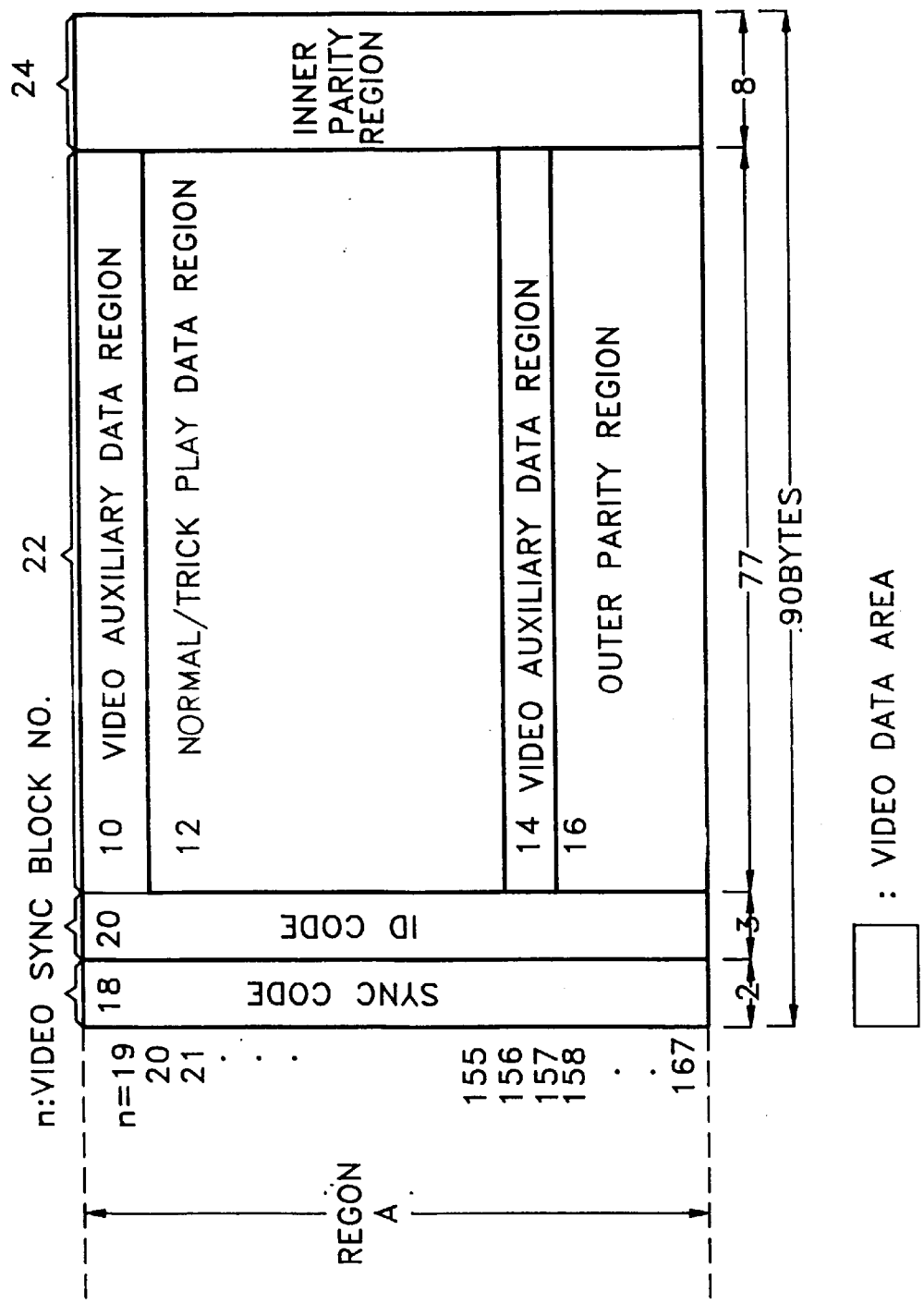
FIG. 4 illustrates a video sector of each track of the digital video tape shown in FIG. 2.

An example of the video sector 6 shown in FIG. 2 is illustrated in FIG. 4. Specifically, the video sector 6 comprises 149 sync blocks which are respectively numbered as sync block 19 to sync block 167. Furthermore, each of the sync blocks 19 to 167 comprises 90 bytes of data which contain a 2-byte sync code 18, a 3-byte identification code 20, a 77-byte data area 22, and an 8-byte inner parity region 24.

In addition, the 77-byte data area 22 for the various sync blocks 19 to 167 store different types of data. Specifically, the data area 22 corresponding to the sync blocks 19 and 20 constitute a first video auxiliary data region 10, and the data area 22 contained in the sync blocks 21 to 155 represent a normal and trick play data region 12. Furthermore, the data area 22 included within the sync blocks 156 and 157 designate a second video auxiliary data region 14, and the data area 22 corresponding to the sync blocks 158 to 167 constitute an outer parity region 16.

The SD-VCR records an ATV signal in the recording area of the track described above. Specifically, the audio and video data which are contained in the ATV signal and correspond to normal play data are respectively recorded in the audio and video sectors 4 and 6. Furthermore, the SD-VCR is capable of transmitting data at a rate of 24.9 Mbits per second, but the bit stream of the ATV signal is transmitted at a rate of 19.3 Mbits per second. Consequently, after the ATV signal for the normal play mode is recorded on the video tape, an area remains on the video tape in which additional data can be recorded at a rate of 5.6 Mbits per second. Thus, trick play data corresponding to a trick play mode may be recorded in this remaining area.

The various video scanners which may be implemented in an SD-VCR and the scan paths traveled by such scanners are illustrated in FIGS. 3A to 3C. Specifically, the figures respectively show overhead views of a 2-head scanner, a 1-double azimuth head scanner, and a 2-double azimuth head scanner. Since a SD-VCR may contain any of the above scanners, a method and/or apparatus for recording and reproducing trick play data via an SD-VCR should be able to adapt to each of the scanners.

Figure 8:
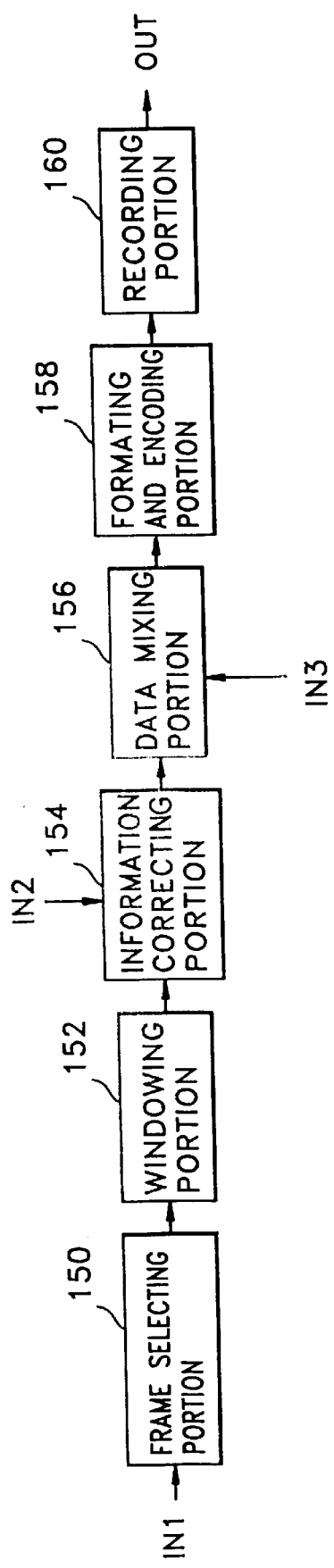
FIG. 8 is a block diagram of a recording apparatus which records trick play data on a digital video tape in accordance with the present invention.
Figure 9:
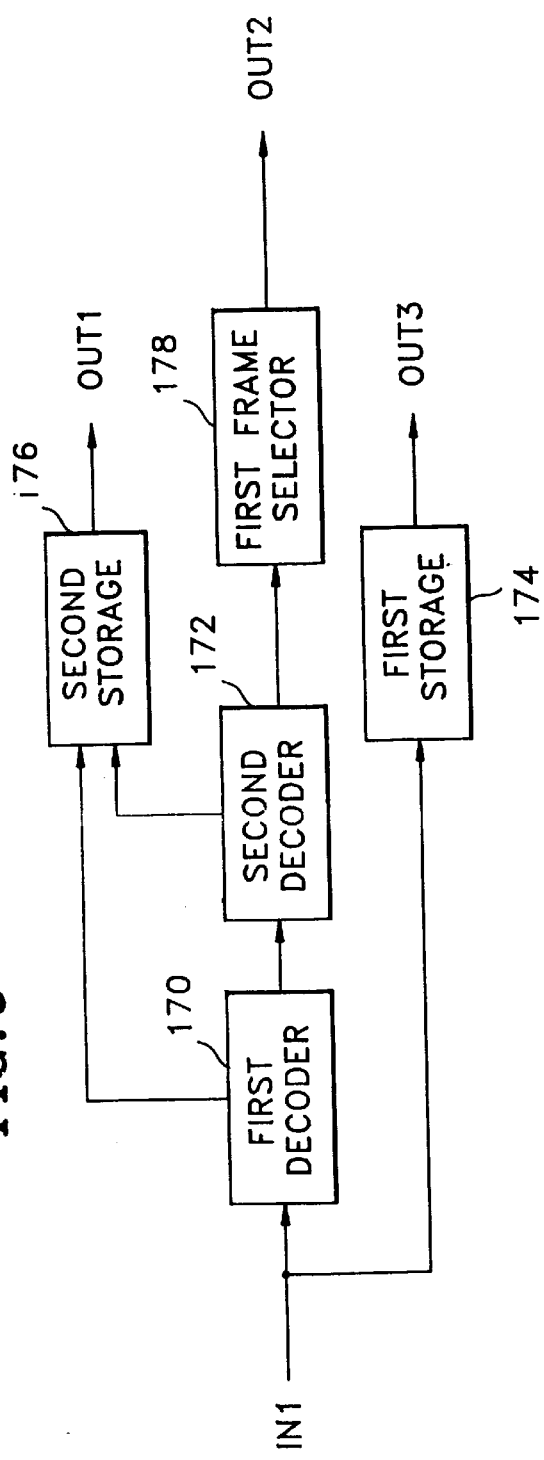
FIG. 9 is a block diagram of a frame selecting portion of the recording apparatus shown in FIG. 8.

One embodiment of an apparatus for recording trick play data on a digital video tape is shown in FIG. 8. In particular, the recording apparatus comprises a frame selecting portion 150, a windowing portion 152, an information correcting portion 154, a data mixing portion 156, a formatting and encoding portion 158, and a recording portion 160. Furthermore, an example of the detailed structure of the frame selecting portion 150 is illustrated in FIG. 9. Specifically, the portion 150 comprises a first decoder 170, a second decoder 172, a first storage portion 174, a second storage portion 176, and a first frame selector 178.

Figure 5:
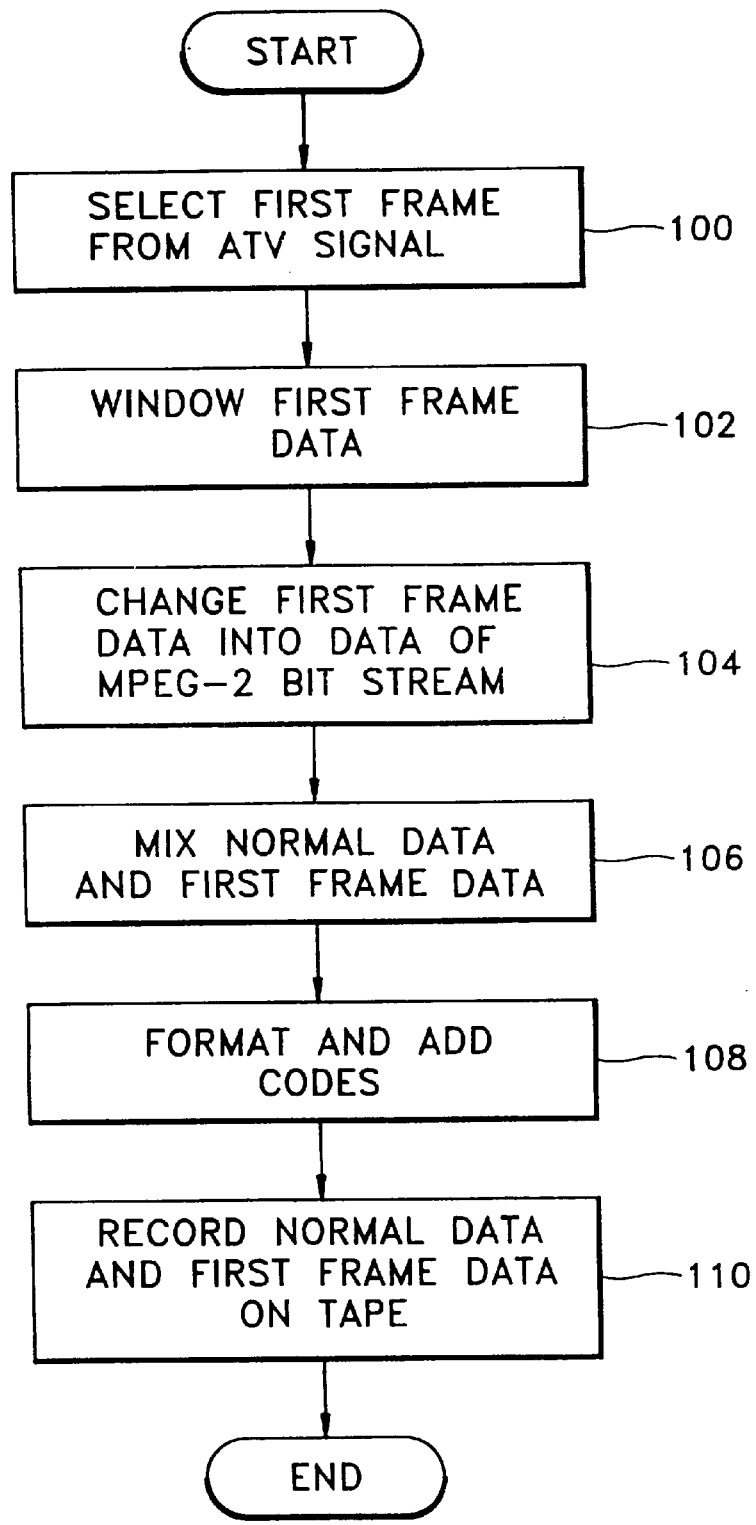
FIG. 5 shows a flow chart for explaining a method for recording trick play data on a digital video tape in accordance with the present invention.

The process by which the recording apparatus records trick play data on a digital video tape will be described below in conjunction with FIGS. 5 and 6. As shown in FIG. 5, the frame selecting portion 150 inputs an ATV signal via an input port IN1 and extracts intra-frame data (i.e. first frame data) from such signal (step 100). Also, in the current example, the intra-frame can be independently decoded and corresponds to trick play data.

Figure 6:
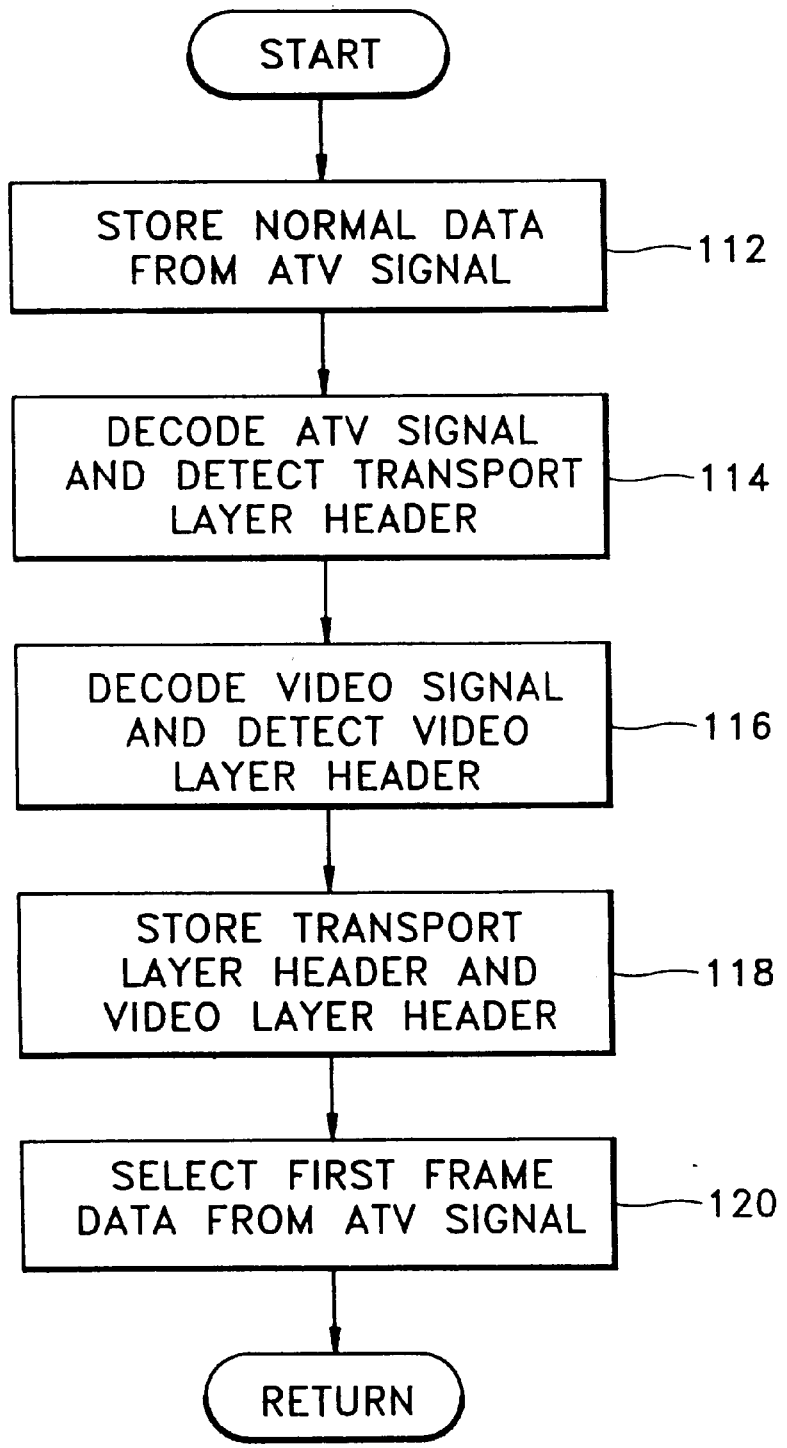
FIG. 6 shows a flow chart of the detailed operations of a frame selecting portion of a recording apparatus which records trick play data on a digital video tape.

The selection process performed by the selecting portion 150 in step 100 is illustrated in more detail in FIG. 6. In particular, the ATV signal is simultaneously input from the input port IN1 and supplied to the first storage portion 174 and the first decoder 170. Then, the first storage portion 174 stores the normal data contained in the ATV signal (step 112), and the first decoder 170 extracts and decodes a transport layer header from the ATV signal (step 114). Afterwards, the second decoder 172 inputs the video signal output from the first decoder 170 and extracts a video layer header from such signal (step 116). Then, the transport layer header and the video layer header are supplied to the second storage portion 176, and the storage portion 176 stores the layer headers as side information (step 118). Meanwhile, the first frame selector 178 inputs the video signal output from the second decoder 172 and selects the intra-frame data from the ATV signal.

After the frame selection portion 150 selects the intra-frame, the intra-frame is output to the windowing portion 152. Then, the windowing portion 152 manipulates the intra-frame so that it fits within a window having a predetermined size (X, Y) (step 102). The process for determining the size of such window will be further described below with reference to FIG. 10.

As described above, the trick play data contained within an ATV signal can be stored in a 5.6 Mbit area of the video tape. Specifically, the 5.6 Mbit area (i.e. the surplus area) contains 30 sync blocks of the 135 sync blocks constituting the normal and trick play data region 12. Moreover, the 30 sync blocks are stored on 27 tracks (i.e. the surplus tracks) of the video tape.

In addition, the video layer header extracted from the second decoder 172 comprises a sequence header which contains information that indicates the horizontal and vertical lengths of the window corresponding to the encoded picture. In the MPEG-2 format, the largest picture contained in the ATV signal bit stream has a picture size of 1920×1080. However, since the number of surplus tracks for storing the trick play data cannot adequately store intra-frames corresponding to a high-definition image having a size of 1920× 1080, the image is modified such that it can fit into a window having an appropriate picture size (X, Y).

Figure 10:
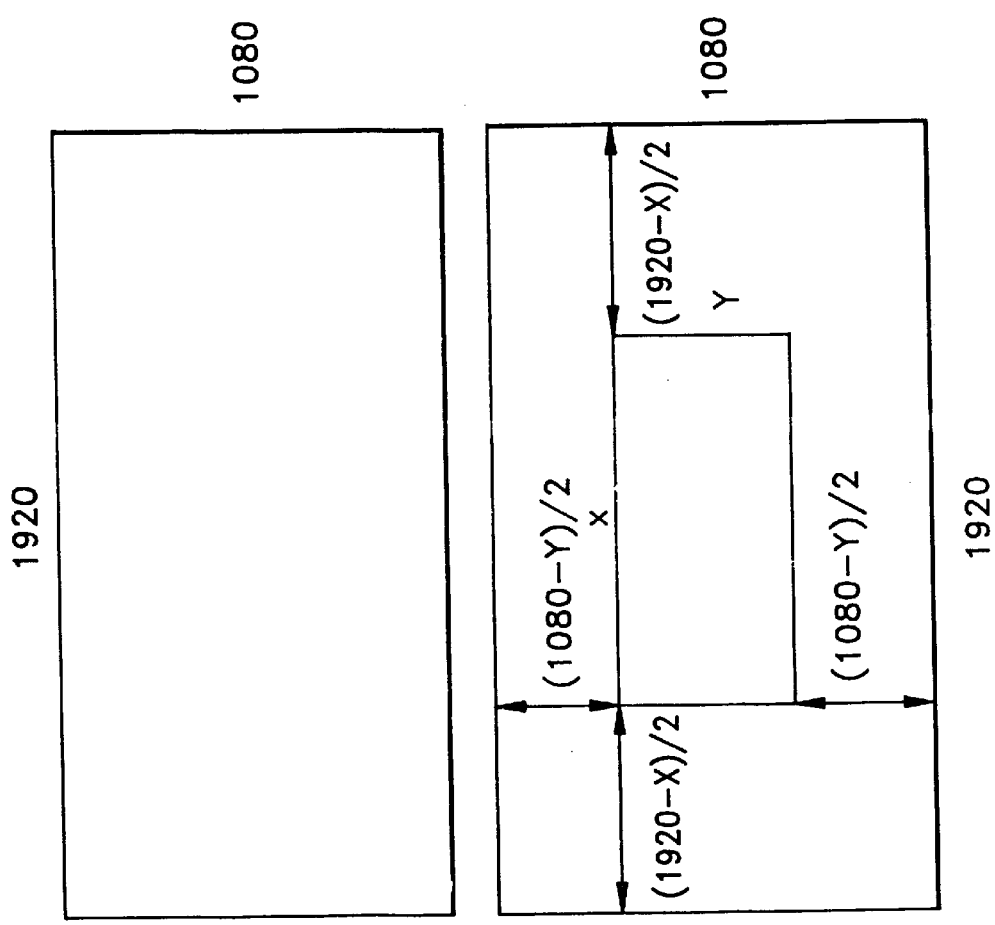
FIG. 10 is a diagram for explaining a method of adjusting a size of an intra-frame contained in an advanced television signal.

During the window generating operation shown in FIG. 10, one frame can be recorded in one track. In addition, a method for extracting trick play data from an ATV signal by partially decoding an intra-frame having a certain picture size (e.g. 720×480) is described below.

In the MPEG-2 format, the ATV signal comprises a slice header that contains a slice-starting-code. Furthermore, the least significant bit of the slice-starting-code indicates the vertical position of a slice, and thus, the vertical position of the window of an intra-frame can be determined. In addition, the ATV signal also contains a macro block header that includes a macro block-address-increase code. As a result, the horizontal position can be determined based on such code.

In the present example, the number of DCT blocks used to generate an intra-frame having a picture size of 720×480 is 8100. Furthermore, if the MPEG-2 sampling format is a 4:2:0 format, each DCT coefficient is represented by 9 bits, and thus, the number of bits needed to represent all of the DCT blocks is 72900 (i.e. 8100×9 bits). On the other hand, the number of video bits which can be recorded in one track is 83160 bits (i.e. 135 sync blocks×77 bytes×8 bits/byte). Thus, since all of the DCT blocks corresponding to one frame can be represented by 72900 bits, one frame can be completely recorded in one track. Moreover, since the number of bits remaining in each track after the DCT blocks have been recorded is 10260 (i.e. 83160−72900), 10260 bits of trick play data can also be recorded in each track.

The DCT coefficients also may be variable-length-encoded, and therefore, the actual number of bits needed to represent each DCT coefficient may be less than 9 bits. Accordingly, the number of bits available in a particular track for storing the trick play data may be greater than 10260. In addition, as the picture size of the intra-frame becomes smaller, the resolution of the intra-frame increases.

After the size of the intra-frame has been properly adjusted, the information correcting portion 154 inputs the intra-frame from the windowing portion 152 and inputs the side information stored in the second storage portion 176 via an input port IN2. Then, the correcting portion 154 transforms the intra-frame data into an MPEG-2 bit stream format and corrects the header information contained in the intra-frame data based on the side information (step 104).

Afterwards, the data mixing portion 156 inputs the intra-frame data from the correcting portion 154 and inputs the normal data stored in first storage portion 174 via an input port IN3. Then, the mixing portion 156 mixes the intra-frame data with the normal data to produce mixed data (step 106).

The mixed data is output to the formatting and encoding portion 158 which formats such data. Specifically, the formatting and encoding portion 158 generates sync blocks representing the mixed data and incorporates identification codes within such sync blocks (step 108). Finally, the recording portion 160 inputs the formatted data from the formatting and encoding portion 158 and records the normal data and the trick play data on the digital video tape (step 110).

Figure 11:
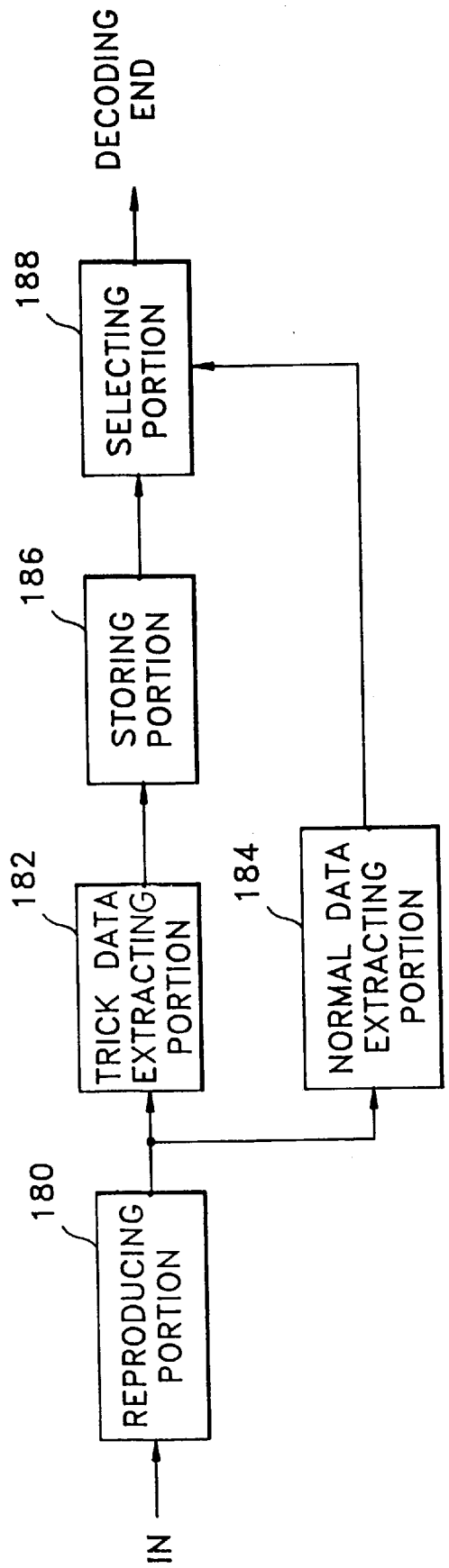
FIG. 11 is a block diagram of a reproducing apparatus which reproduces trick play data from a digital video tape in accordance with the present invention.

An embodiment of an apparatus for reproducing trick play data from a digital video tape is shown in FIG. 11. In particular, the reproducing apparatus comprises a reproducing portion 180, a trick data extracting portion 182, a normal data extracting portion 184, a storing portion 186, and a selecting portion 188.

Figure 7:
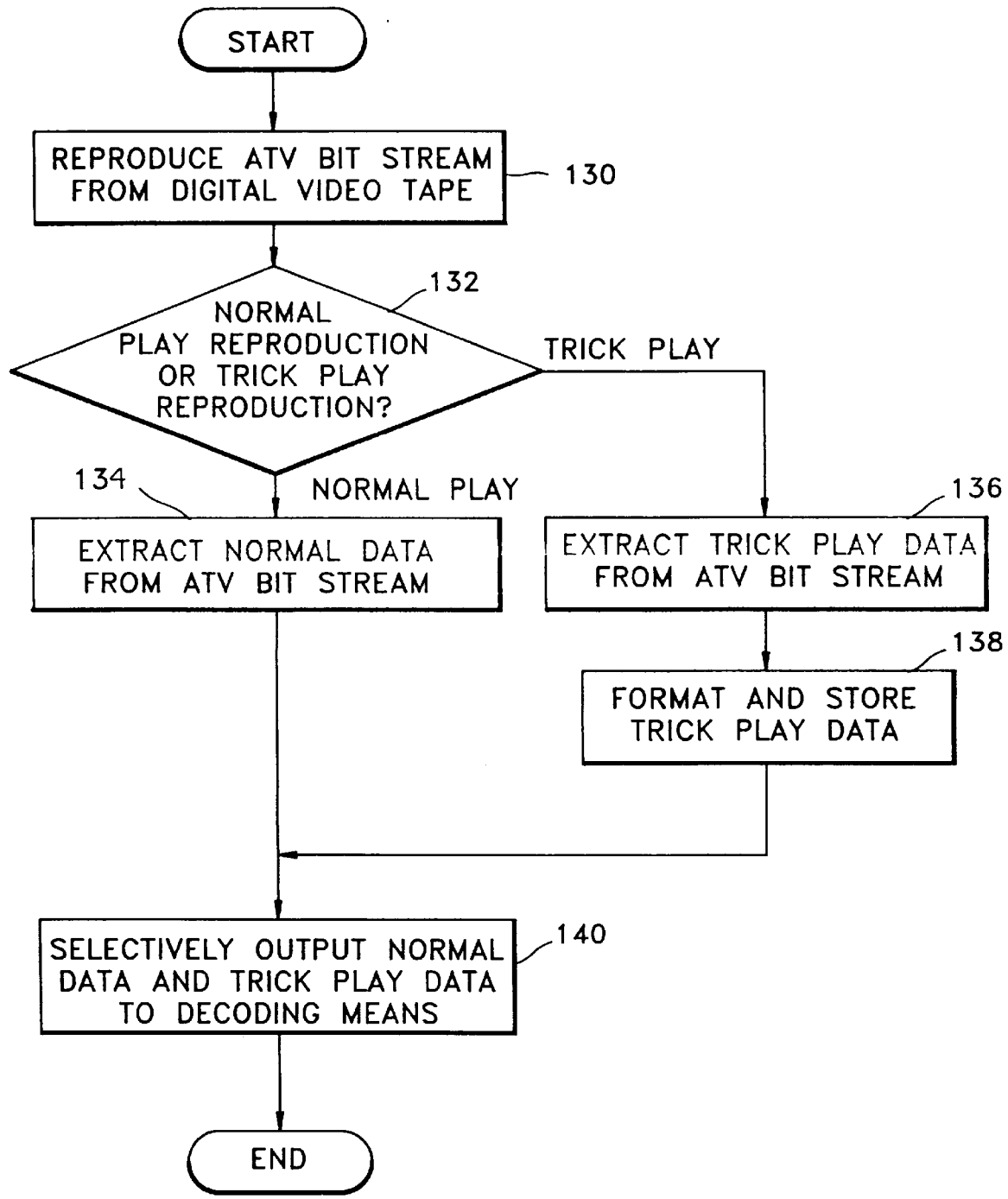
FIG. 7 shows a flow chart for explaining a method for reproducing trick play data from a digital video tape in accordance with the present invention.

The operation of the reproducing apparatus will be described below with reference to FIG. 7. First, the reproducing portion 180 reproduces the ATV signal from the digital video tape (step 130), and a system control portion (not shown) determines if the ATV signal has been reproduced during a normal play mode or a trick play mode (step 132).

If the reproduced signal corresponds to a normal play reproduction, the ATV signal is output to the normal data extracting portion 184, and the extracting portion 184 extracts the normal data from the ATV signal (step 134). On the other hand, if the reproduced signal relates to a trick play reproduction, the trick data extracting portion 182 inputs the ATV signal and extracts the trick play data (step 136). Then, the windowed trick play data is temporarily stored in the storing portion 186 and appropriately formatted so that it can be properly decoded (step 138). The selecting portion 188 inputs the normal data from the normal data extracting portion 184 and the trick play data from storing portion 186 and selectively outputs either the trick play data or the normal data to a decoder (step 140).

As described above, the method and apparatus for recording and reproducing trick play data to and from a digital video tape enables various types of scanners to record or reproduce the trick play data at a maximum multiple-speed (e.g. a 13-multiple-speed) or less than the maximum multiple-speed. In addition, a high-speed trick play operation can be accurately and stably performed during the recording and reproducing of an ATV signal via a VCR. For example, since one GOP has 12 frames, the GOP can be recorded in 120 tracks, and 27 tracks of the 120 tracks can be used to record trick play data. As a result, a high-speed trick play operation can be accurately performed by repeatedly recording trick play data for one trick play in each of the 27 tracks.

Furthermore, the embodiments described above are merely illustrative, and modifications of such embodiments may occur to those skilled in the art. Accordingly, this invention is not to be regarded as limited to the embodiments disclosed herein, but is to be limited only as defined by the appended claims.

What is claimed is:

1. A method for reproducing trick play data and normal data from a digital video tape, wherein said trick play data is used in a trick play mode and said normal data is used in a normal play mode, wherein said trick play data corresponds to first frame data contained in an advanced television bit stream previously recorded on said digital video tape, and wherein the method comprises the steps of:

(a) reproducing said advanced television bit stream from said digital video tape;

(b) determining whether said advanced television bit stream is being reproduced during said normal play mode or said trick play mode;

(c) extracting said normal data from said advanced television bit stream when said advanced television bit stream is being reproduced during said normal play mode; and (d) extracting said first frame data from said advanced television bit stream when said advanced television bit stream is being reproduced during said trick play mode, wherein a picture size of said first frame data is adjusted to a predetermined picture size before said first frame data is recorded on said digital video tape, wherein said predetermined picture size is determined based on side information, and wherein said side information is obtained by decoding said advanced television bit stream before said advanced television bit stream is recorded on said digital video tape.

2. The method for reproducing according to claim 1, wherein said first frame data is capable of being independently decoded.

3. A method for reproducing trick play data and normal data from a digital video tape, wherein said trick play data is used in a trick play mode and said normal data is used in a normal play mode, wherein said trick play data corresponds to first frame data contained in an advanced television bit stream previously recorded on said digital video tape, and wherein the method comprises the steps of:

(a) reproducing said advanced television bit stream from said digital video tape;

(b) determining whether said advanced television bit stream is being reproduced during said normal play mode or said trick play mode;

(c) extracting said normal data from said advanced television bit stream when said advanced television bit stream is being reproduced during said normal play mode; and (d) extracting said first frame data from said advanced television bit stream when said advanced television bit stream is being reproduced during said trick play mode, wherein a picture size of said first frame data is adjusted to a predetermined picture size before said first frame data is recorded on said digital video tape, wherein said predetermined picture size is determined based on side information, and wherein said side information is obtained by decoding said advanced television bit stream before said advanced television bit stream is recorded on said digital video tape;

(e) temporarily storing said first frame data after said first frame data has been extracted; and (f) selectively outputting said first frame data or said normal data to a decoder.

4. The method for reproducing according to claim 3, wherein said step (e) of temporarily storing said first frame data comprises the step of:

(e1) formatting said first frame data into a format which is compatible with said decoder.

5. An apparatus for reproducing trick play data and normal data from a digital video tape, wherein said trick play data is used in a trick play mode and said normal data is used in a normal play mode, wherein said trick play data corresponds to first frame data contained in an advanced television bit stream previously recorded on said digital video tape, and wherein the apparatus comprises:

reproducing means for reproducing said advanced television bit stream from said digital video tape;

system control means for determining whether reproducing means is reproducing said advanced television bit stream during said normal play mode or said trick play mode;

normal data extracting means for extracting said normal data from said advanced television bit stream when said advanced television bit stream is being reproduced during said normal play mode; and trick data extracting means for extracting said first frame data from said advanced television bit stream when said advanced television bit stream is being reproduced during said trick play mode, wherein a picture size of said first frame data is adjusted to a predetermined picture size before said first frame data is recorded on said digital video tape, wherein said predetermined picture size is determined based on side information, and wherein said side information is obtained by decoding said advanced television bit stream before said advanced television bit stream is recorded on said digital video tape.

6. The apparatus according to claim 5, wherein said first frame data is capable of being independently decoded.

7. An apparatus for reproducing trick play data and normal data from a digital video tape, wherein said trick play data is used in a trick play mode and said normal data is used in a normal play mode, wherein said trick play data corresponds to first frame data contained in an advanced television bit stream previously recorded on said digital video tape, and wherein the apparatus comprises:

reproducing means for reproducing said advanced television bit stream from said digital video tape;

system control means for determining whether reproducing means is reproducing said advanced television bit stream during said normal play mode or said trick play mode;

normal data extracting means for extracting said normal data from said advanced television bit stream when said advanced television bit stream is being reproduced during said normal play mode; and trick data extracting means for extracting said first frame data from said advanced television bit stream when said advanced television bit stream is being reproduced during said trick play mode, wherein a picture size of said first frame data is adjusted to a predetermined picture size before said first frame data is recorded on said digital video tape, wherein said predetermined picture size is determined based on side information, and wherein said side information is obtained by decoding said advanced television bit stream before said advanced television bit stream is recorded on said digital video tape;

storing means for temporarily storing said first frame data after said first frame data has been extracted by said trick data extracting means; and selecting means for selectively outputting said first frame data output from said storing means or said normal data output from said normal data extracting means to a decoder.

8. The method for reproducing according to claim 7, wherein said storing means comprises:

formatting means for formatting said first frame data into a format which is compatible with said decoder.

* * * * *